US012689115B2

(12) United States Patent
Sun et al.

(10) Patent No.: US 12,689,115 B2
(45) Date of Patent: Jul. 21, 2026

(54) RADIATING ELEMENTS HAVING COMMON MODE CURRENT SUPPRESSION CIRCUITS

(71) Applicant: Outdoor Wireless Networks LLC, Claremont, NC (US)

(72) Inventors: Bin Sun, Suzhou (CN); Changfu Chen, Suzhou (CN); Jian Zhang, Suzhou (CN); Cheng Xue, Suzhou (CN); Pengfei Guo, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 261 days.

(21) Appl. No.: 18/493,712

(22) Filed: Oct. 24, 2023

(65) Prior Publication Data

US 2024/0145938 A1 May 2, 2024

(30) Foreign Application Priority Data

Oct. 27, 2022 (CN) ......................... 202211322299.3

(51) Int. Cl.
*H01Q 1/24* (2006.01)
*H01Q 1/52* (2006.01)
*H01Q 21/26* (2006.01)

(52) U.S. Cl.
CPC ............. *H01Q 1/246* (2013.01); *H01Q 1/523* (2013.01); *H01Q 21/26* (2013.01)

(58) Field of Classification Search
CPC ............ H01Q 1/246; H01Q 1/50; H01Q 1/52; H01Q 1/521; H01Q 1/523; H01Q 1/525; H01Q 5/314; H01Q 5/321; H01Q 5/40; H01Q 5/48; H01Q 9/16; H01Q 9/26; H01Q 9/265; H01Q 9/28; H01Q 9/285; H01Q 21/062; H01Q 21/24; H01Q 21/26
See application file for complete search history.

(56) References Cited

U.S. PATENT DOCUMENTS

2022/0173507 A1* 6/2022 Varnoosfaderani .......................... H01Q 21/0006
2023/0361475 A1* 11/2023 Sun .......................... H01Q 5/48
2024/0204408 A1* 6/2024 Himath .................... H01Q 5/48

* cited by examiner

*Primary Examiner* — Robert Karacsony
(74) *Attorney, Agent, or Firm* — Myers Bigel, P.A.

(57) ABSTRACT

A radiating element includes: a plurality of radiators, where each radiator includes a first side arm segment and a second side arm segment; a plurality of feeder rods, where each feeder rod is electrically connected to a respective one of a plurality of first side arm segments and a plurality of second side arm segments, where each group of feeder rods and their connected side arm segments include a first portion and a second portion electrically insulating from each other; and at least one common mode current suppressing component, where each common mode current suppressing component includes a first conductive portion and a second conductive portion adjacent to each other and electrically insulating, where the first conductive portion is electrically connected between a first portion of a group of feeder rods and their connected side arm segments and a second portion of an adjacent group of feeder rods and their connected side arm segments, and the second conductive portion is electrically connected between a second portion of a group of feeder rods and their connected side arm segments and a first portion of an adjacent group of feeder rods and their connected side arm segments.

19 Claims, 8 Drawing Sheets

RADIATING ELEMENTS HAVING COMMON MODE CURRENT SUPPRESSION CIRCUITS

RELATED APPLICATION

The present application claims priority from and the benefit of Chinese Patent Application No. 202211322299.3, filed Oct. 27, 2022, the disclosure of which is hereby incorporated herein by reference in full.

FIELD OF THE INVENTION

The present disclosure relates to the technical field of communication; specifically, it relates to a radiating element and a base station antenna.

BACKGROUND OF THE INVENTION

Cellular communication systems are well known in the art. In a typical cellular communication system, geographic regions are often divided into a series of regions commonly referred to as "cells" which are served by corresponding base stations. Each base station may include one or more base station antennas that are configured to provide two-way radio frequency ("RF") communication with mobile subscribers within a cell served by the base station. Typically, the base station antenna is mounted on a tower or other raised structure, and a radiation pattern is directed outwards. In many cases, each base station may be divided into "sectors." In a most common configuration, a hexagonal cell may be divided into three 120° sectors, and each sector may be served by one or more base station antennas, which may have an azimuth half power beam width (HPBW) of approximately 65°, thereby providing sufficient coverage for each 120° sector. The base station antenna may include a linear or planar phased array of radiating elements. For example, a radiating element may be a box dipole radiating element. Such radiating element may generate a radiation signal under the action of a differential mode current, but at the same time, there is often a common mode current in the radiating element, and the common mode current may cause an HPBW of the signal to increase and directionality of the signal to deteriorate.

SUMMARY OF THE INVENTION

One of purposes of the present disclosure is to propose a radiating element and a base station antenna to reduce adverse effects of a common mode current on a generated radiation signal.

According to a first aspect of the present disclosure, a radiating element is provided, including:

- a plurality of radiators, where each radiator of the plurality of radiators includes a first side arm segment and a second side arm segment, and a first side arm segment of one radiator and a second side arm segment of an adjacent radiator are adjacent to each other;
- a plurality of feeder rods, where each feeder rod of the plurality of feeder rods is electrically connected to a respective one of a plurality of first side arm segments and a plurality of second side arm segments, where each group of feeder rods and their connected side arm segments include a first portion and a second portion electrically insulated from each other, and the first portion is located inside the radiating element compared to the second portion; and

- at least one common mode current suppressing component, where each common mode current suppressing component of the at least one common mode current suppressing component includes a first conductive portion and a second conductive portion adjacent to each other and electrically insulating, where the first conductive portion is electrically connected between a first portion of a group of feeder rods and their connected side arm segments and a second portion of an adjacent group of feeder rods and their connected side arm segments, and the second conductive portion is electrically connected between a second portion of the group of feeder rods and their connected side arm segments and a first portion of the adjacent group of feeder rods and their connected side arm segments, so that common mode currents from adjacent two groups of feeder rods and their connected side arm segments flow in opposite directions in the first conductive portion and the second conductive portion of the common mode current suppressing component.

In some embodiments, differential mode currents from adjacent two groups of feeder rods and their connected side arm segments flow in a same direction in the first conductive portion and the second conductive portion of the common mode current suppressing component.

In some embodiments, each side arm segment of at least two adjacent side arm segments includes a first radiation portion and a second radiation portion electrically isolated from each other, and the first radiation portion is located inside the radiating element compared to the second radiation portion; the first conductive portion of the common mode current suppressing component is electrically connected between a first radiation portion of a first side arm segment of one radiator and a second radiation portion of a second side arm segment of an adjacent radiator, and the second conductive portion is electrically connected between a second radiation portion of the first side arm segment of the one radiator and a first radiation portion of the second side arm segment of the adjacent radiator.

In some embodiments, a length of the second radiation portion of the side arm segment is less than or equal to ¼ times the center operating wavelength.

In some embodiments, each feeder rod of at least two adjacent feeder rods includes a first feed portion and a second feed portion electrically isolated from each other, and the second feed portion is directly connected to a corresponding side arm segment; the first conductive portion of the common mode current suppressing component is electrically connected between a first feed portion of a feeder rod and a second feed portion of an adjacent feeder rod, and the second conductive portion is electrically connected between a second feed portion of the one feeder rod and a first feed portion of the adjacent feeder rod.

In some embodiments, a length of the side arm segment is less than or equal to ¼ times the center operating wavelength.

In some embodiments, one or more common mode current suppressing components are connected to each group of feeder rods and their connected side arm segments.

In some embodiments, at least one group of feeder rods and their connected side arm segments are connected to two common mode current suppressing components, where one common mode current suppressing component is electrically connected between two adjacent feeder rods, and the other common mode current suppressing component is electrically connected between two adjacent side arm segments.

In some embodiments, the first side arm segment of the one radiator and the second side arm segment of the adjacent radiator are parallel to each other.

In some embodiments, a portion of the plurality of first side arm segments and a portion of the plurality of second side arm segments extend in a first direction, and another portion of the side arm segments extend in a second direction perpendicular to the first direction.

In some embodiments, an extension direction of each feeder rod of the plurality of feeders is perpendicular to a plane in which the plurality of radiators are located.

In some embodiments, each radiator further includes an external arm segment connected between the first side arm segment and the second side arm segment.

In some embodiments, the radiating element includes four radiators arranged coplanarly, and four external arm segments of the four radiators are respectively arranged on four sides of a quadrilateral.

In some embodiments, the common mode current suppressing component further includes an insulating portion disposed between the first conductive portion and the second conductive portion.

In some embodiments, the first conductive portion of the common mode current suppressing component includes a first contact segment and a first transmission segment located on a first plane, where the first contact segment is electrically connected between the feeder rod and its connected side arm segment and the first transmission segment; and the second conductive portion of the common mode current suppressing component includes a second contact segment located on the first plane, a second transmission segment located on a second plane parallel to the first plane, and a conductive through hole electrically connected between the second contact segment and the second transmission segment, where the second contact segment is electrically connected between the feeder rod and its connected side arm segment and the second transmission segment, and the conductive through hole is provided in an insulating portion located between the first plane and the second plane.

In some embodiments, the first transmission segment and the second transmission segment are parallel to each other.

In some embodiments, a distance between the first transmission segment and the second transmission segment is less than or equal to 5 mm.

The present disclosure further provides a radiating element, comprising: a plurality of radiators, wherein each radiator of the plurality of radiators comprises a first side arm segment and a second side arm segment, and a first side arm segment of one radiator and a second side arm segment of an adjacent radiator are adjacent to each other, wherein a common mode current suppression circuit electrically connects a first side arm segment of a first of the radiators to a second side arm segment of a second of the radiators.

In some embodiments, the first side arm segment of the first of the radiators is adjacent the second side arm segment of the second of the radiators.

In some embodiments, a respective common mode current suppression circuit electrically connects a first side arm segment of a each of the radiators to a second side arm segment of a different one of the radiators.

In some embodiments, the common mode current suppression circuit includes a first conductive portion that is electrically connected between a first radiation portion of the first side arm segment of the first of the radiators and a second radiation portion of the second side arm segment of the second of the radiators, and a second conductive portion that is electrically connected between a second radiation portion of the first side arm segment of the first of the radiators and a first radiation portion of the second side arm segment of the second of the radiators.

According to a second aspect of the present disclosure, a base station antenna is provided, and the base station antenna includes the foregoing radiating element.

Through the following detailed description of exemplary embodiments of the present disclosure by referencing the attached drawings, other features and advantages of the present disclosure will become clear.

BRIEF DESCRIPTION OF THE DRAWINGS

The drawings, which form a part of the specification, describe embodiments of the present disclosure and, together with the specification, are used to explain the principles of the present disclosure.

The present disclosure can be understood more clearly according to the following detailed description with reference to the drawings, in which.

Note that in the embodiments described below, the same reference signs are sometimes jointly used between different attached drawings to denote the same parts or parts with the same functions, and repeated descriptions thereof are omitted. In this Specification, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the disclosed invention is not limited to the positions, dimensions, and ranges disclosed in the attached drawings and the like. In addition, the attached drawings are not necessarily drawn to scale, and some features may be enlarged to show details of specific components.

DETAILED DESCRIPTION OF SPECIFIC EMBODIMENTS

Various exemplary embodiments of the present disclosure will now be described in detail by referencing the attached drawings. It should be noted: unless otherwise specifically stated, the relative arrangement, numerical expressions and numerical values of components and steps set forth in these embodiments do not limit the scope of the present disclosure.

The following description of at least one exemplary embodiment is actually only illustrative, and in no way serves as any limitation to the present disclosure and its application or use. That is, a radiating element and a base station antenna herein are shown in an exemplary manner to illustrate different embodiments of the present disclosure and are not intended to be limiting. Those skilled in the art will understand that they only illustrate exemplary ways of implementing the present disclosure, rather than exhaustive ways.

The technologies, methods, and equipment known to those of ordinary skill in the art may not be discussed in detail, but where appropriate, the technologies, methods, and equipment should be regarded as part of the granted Specification.

Figure 1:
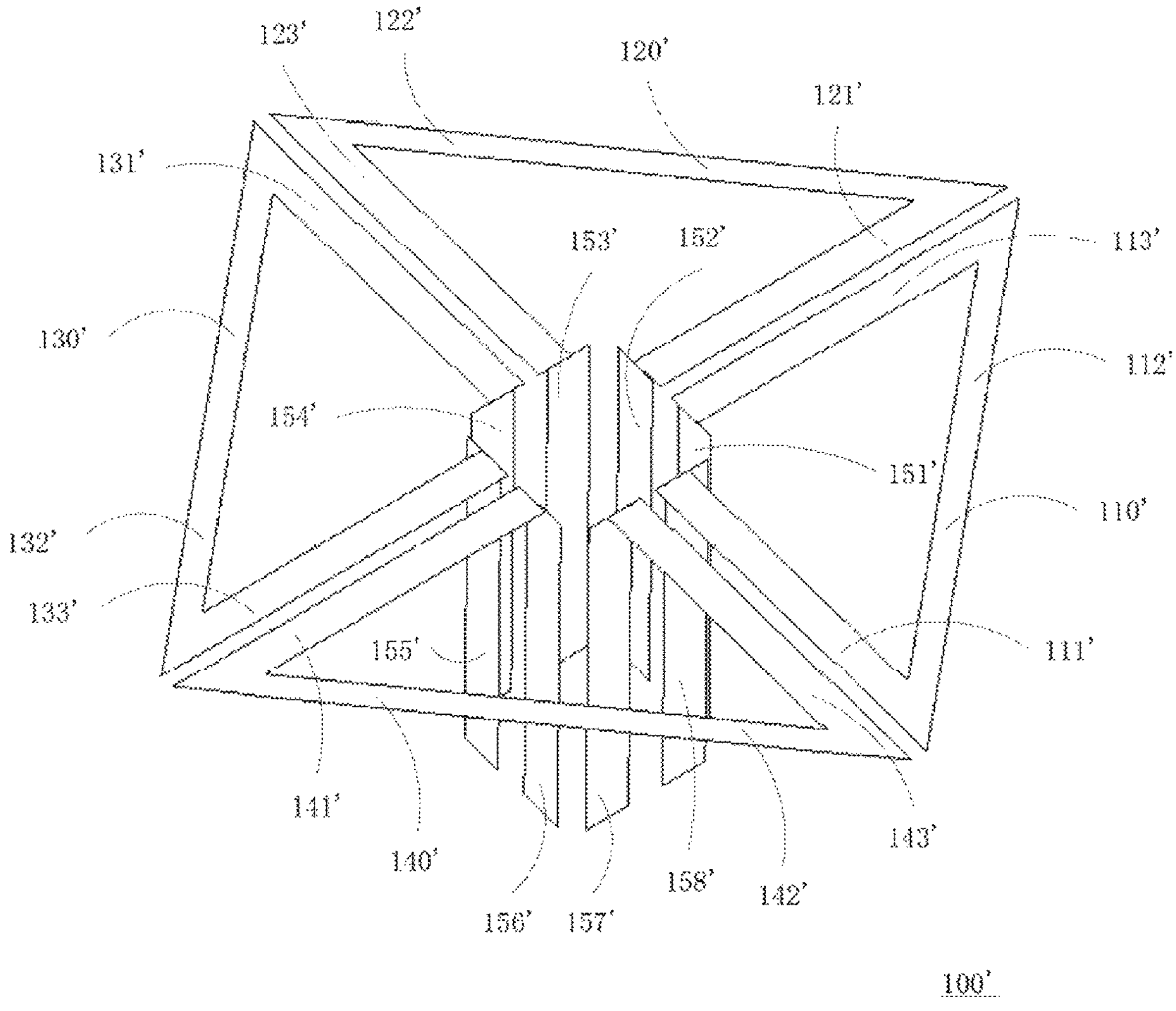
Fig. 1 (Prior Art)
FIG. 1 shows a schematic structural diagram of a radiating element.

As shown in FIG. 1, a box dipole radiating element 100' may include four radiators 110', 120', 130' and 140', and these radiators 110', 120', 130' and 140' may be arranged in a common plane parallel to a reflector plane of a base station antenna and located in front of the reflector. Each radiator may include a first side arm segment, an external arm segment, and a second side arm segment connected sequentially. Specifically, the radiator 110' may include a first side arm segment 111', an external arm segment 112', and a second side arm segment 113' connected sequentially, the radiator 120' may include a first side arm segment 121', an external arm segment 122', and a second side arm segment 123' connected sequentially, the radiator 130' may include a first side arm segment 131', an external arm segment 132', and a second side arm segment 133' connected sequentially, and the radiator 140' may include a first side arm segment 141', an external arm segment 142', and a second side arm segment 143' connected sequentially. The four external arm segments 112', 122', 132' and 142' of the four radiators 110', 120', 130' and 140' may be respectively arranged on four sides of a quadrilateral, and the side arm segments 113', 121', 133' and 141' may extend in a first direction between the center and corners of the radiating element, while the side arm segments 143', 111', 123' and 131' may extend in a second direction perpendicular to the first direction between the center and corners of the radiating element, thereby forming the box dipole radiating element 100'. In addition, the box dipole radiating element 100' may also include eight feeder rods 151'-158'. The extension direction of these feeder rods may be perpendicular to the aforementioned common plane, and each feeder rod is electrically connected to a corresponding side arm segment, thereby feeding the side arm segment to cause the radiating element 100' to generate a radiation signal.

Figure 2:
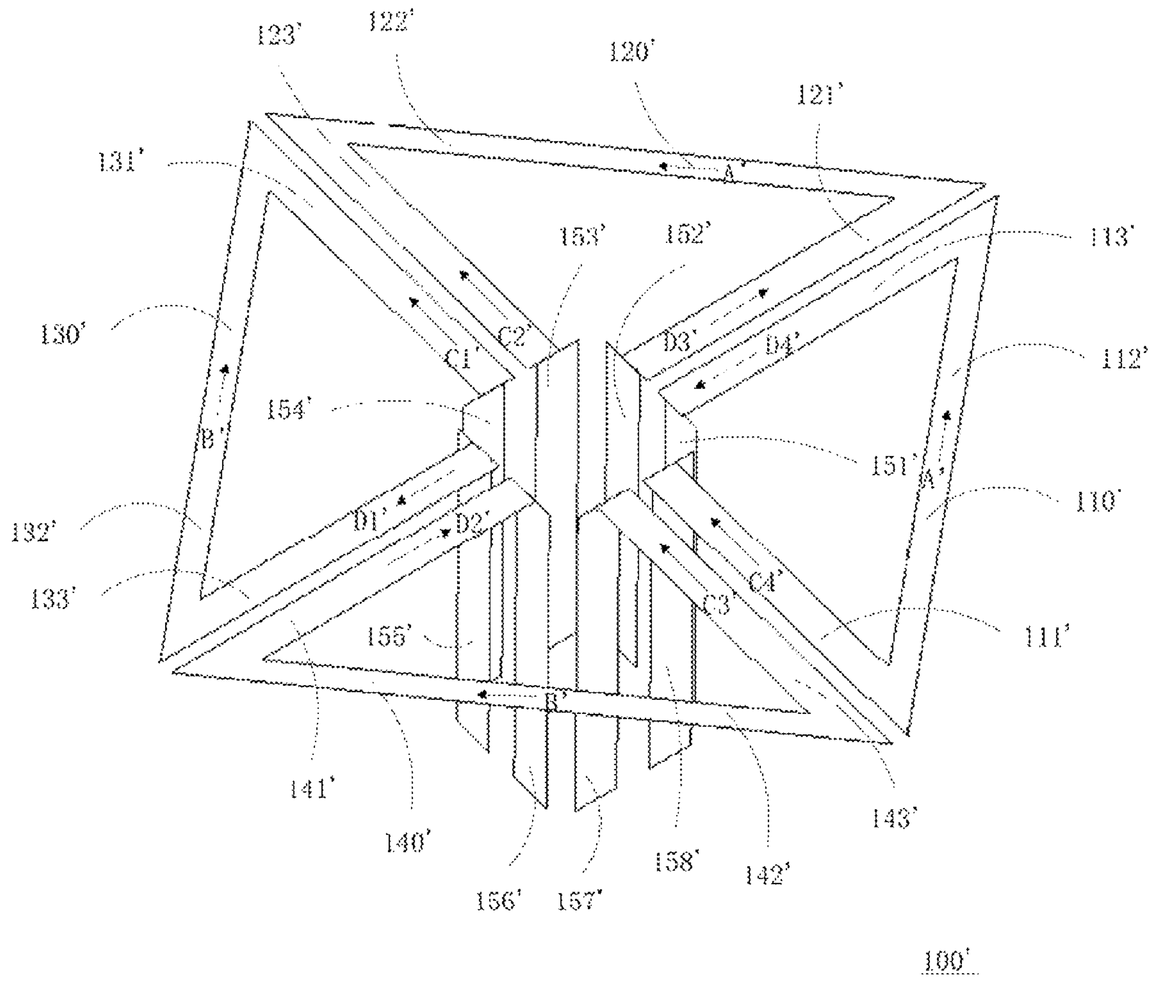
Fig. 2 (Prior Art)
FIG. 2 shows a feeding schematic diagram in the radiating element of FIG. 1.

A current of the radiating element when the radiation signal is generated will be described in detail by an example of feeding the side arm segments 113', 121', 133' and 141' extending in the first direction. Specifically, as shown in FIG. 2, the second side arm segment 113' of the radiator 110', the first side arm segment 121' of the radiator 120', the second side arm segment 133' of the radiator 130', and the first side arm segment 141' of the radiator 140' are fed through the corresponding four feeder rods 151', 152', 155', and 156', respectively, thereby generating differential mode currents D1' and D2' in the adjacent second side arm segment 133' and first side arm segment 141', respectively, and generating differential mode currents D4' and D3' in the adjacent second side arm segment 113' and first side arm segment 121', respectively. The currents D1' and D3' flow from the inside to the outside of the radiating element, while the currents D2' and D4' flow from the outside to the inside of the radiating element. Accordingly, based on the structure of the individual radiator, a current A' will be generated in the external arm segment 112' of the radiator 110' and the external arm segment 122' of the radiator 120' as shown in FIG. 2, while a current B' will be generated in the external arm segment 132' of the radiator 130' and the external arm segment 142' of the radiator 140' as shown in FIG. 2. Under the action of the current A' and the current B', a radiation signal with a polarization direction along the second direction (extension direction of the second side arm segment 123', the first side arm segment 131', the second side arm segment 143', or the first side arm segment 111' shown in FIG. 2) will be generated.

In addition, on the one hand, in each radiator, a direction of a current will be steered after a certain electrical length (for example, an odd multiple of a half wavelength), thereby resulting in some common mode currents in the same direction generated in adjacent side arm segments. On the other hand, the radiation signal generated will induce generation of some common mode currents in the second side arm segment 123', the first side arm segment 131', the second side arm segment 143', and the first side arm segment 111', respectively. Therefore, common mode currents C1', C2', C3', and C4' will be generated in the first side arm segment 131', the second side arm segment 123', the second side arm segment 143', and the first side arm segment 111', respectively, where the currents C1' and C2' flow from inside to outside of the radiating element, and the currents C3' and C4' flow from outside to inside of the radiating element.

Similarly, when feeding the side arm segments 111', 123', 131', and 143' shown in FIG. 2, a radiation signal with a polarization direction along the extension direction of the second side arm segment 133', the first side arm segment 141', the second side arm segment 113', or the first side arm segment 121' shown in FIG. 2 will be generated, while a corresponding common mode current will be generated in the second side arm segment 113', the first side arm segment 121', the second side arm segment 133', and the first side arm segment 141'. Because the polarization direction of the radiation signal generated by feeding the side arm segments 113', 121', 133', and 141' is perpendicular to the polarization direction of the radiation signal generated by feeding the side arm segments 111', 123', 131', and 143', mutual interference may not occur therebetween.

Figure 3:
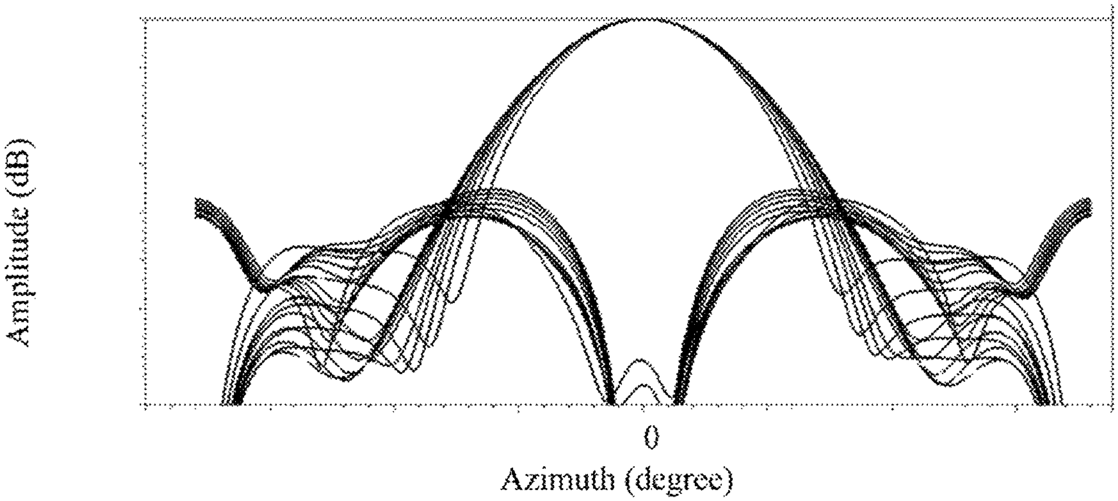
Fig. 3 (Prior Art)
FIG. 3 shows a schematic diagram of a radiation pattern of the radiating element of FIG. 1 in an azimuth plane.

However, in a radiation pattern of the radiating element as shown in FIG. 3, the curve with the greatest amplitude at the azimuth angle of 0 represents the radiation pattern of the main polarization of the radiating element, and the presence of the common mode current will cause the HPBW of the radiation pattern to increase, resulting in directionality of the radiation signal to deteriorate, thereby deteriorating the performance of the base station antenna including such radiating element.

In order to solve the above problem, the present disclosure proposes a radiating element that attenuates the adverse effect of common mode currents on the HPBW and directionality of the generated radiation signal by setting a common mode current suppressing component in the radiating element.

In an exemplary embodiment of the present disclosure, the radiating element may include a plurality of radiators, each radiator may include a first side arm segment and a second side arm segment, and a first side arm segment of one radiator is adjacent to a second side arm segment of an adjacent one radiator.

Figure 4:
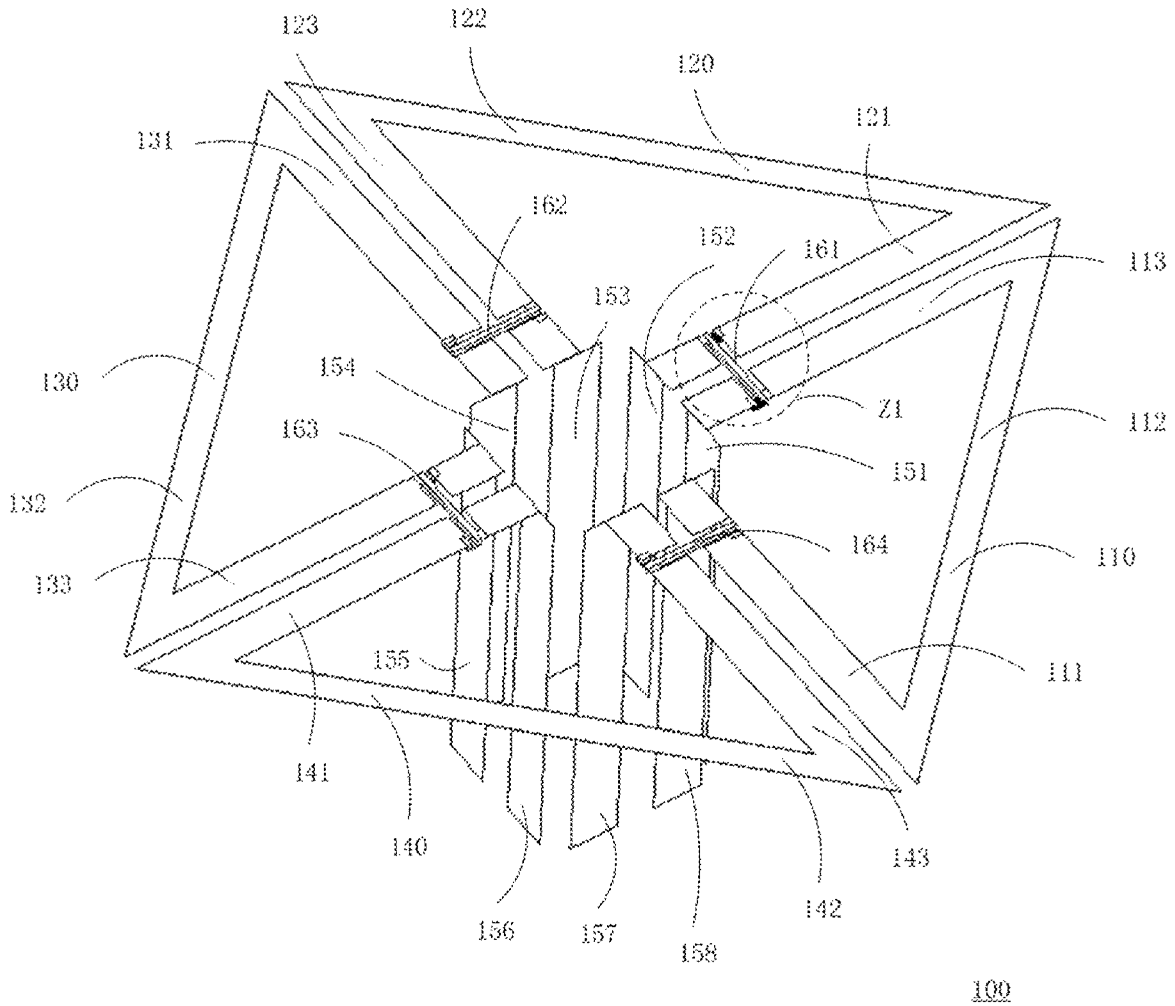
FIG. 4 shows a schematic structural diagram of a radiating element according to an exemplary embodiment of the present disclosure.
Figure 12:
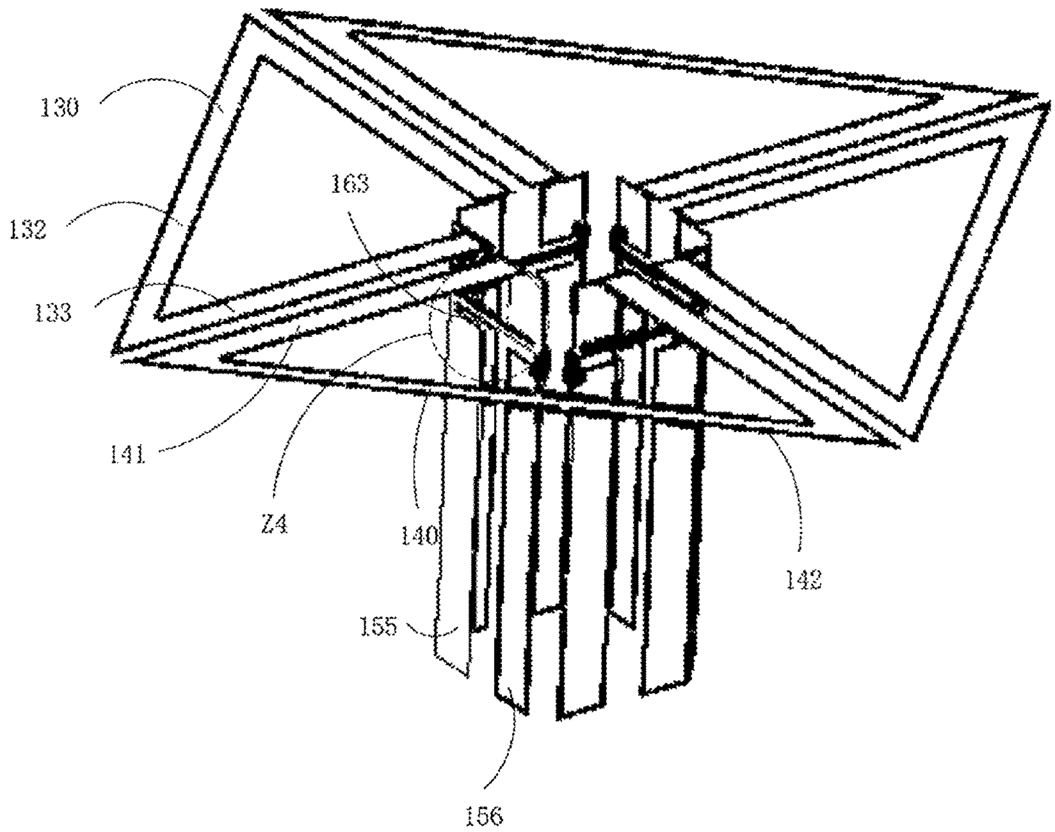
FIG. 12 shows a schematic structural diagram of a radiating element according to another exemplary embodiment of the present disclosure.

As shown in FIG. 4 and FIG. 12, in some specific embodiments, a radiating element 100 may include four radiators 110, 120, 130 and 140, where the radiator 110 may include a first side arm segment 111 and a second side arm segment 113, the radiator 120 may include a first side arm segment 121 and a second side arm segment 123, the radiator 130 may include a first side arm segment 131 and a second side arm segment 133, and the radiator 140 may include a first side arm segment 141 and a second side arm segment 143. In addition, the first side arm segment 111 of the radiator 110 is adjacent to the second side arm segment 143 of the adjacent radiator 140, the second side arm segment 113 of the radiator 110 is adjacent to the first side arm segment 121 of the adjacent radiator 120, the second side arm segment 123 of the radiator 120 is adjacent to the first side arm segment 131 of the adjacent radiator 130, and the second side arm segment 133 of the radiator 130 is adjacent to the first side arm segment 141 of the adjacent radiator 140.

Further, in some embodiments, a first side arm segment of one radiator may be parallel to a second side arm segment of an adjacent radiator. As shown in FIG. 4 and FIG. 12, the first side arm segment 111 of the radiator 110 may be parallel to the second side arm segment 143 of the adjacent radiator 140, the second side arm segment 113 of the radiator 110 may be parallel to the first side arm segment 121 of the adjacent radiator 120, the second side arm segment 123 of the radiator 120 may be parallel to the first side arm segment 131 of the adjacent radiator 130, and the second side arm segment 133 of the radiator 130 may be parallel to the first side arm segment 141 of the adjacent radiator 140.

Further, in some embodiments, a portion of the plurality of first side arm segments and a portion of the plurality of second side arm segments may extend in a first direction, and another portion of the side arm segments may extend in a second direction perpendicular to the first direction. As shown in FIG. 4 and FIG. 12, the second side arm segment 113, the first side arm segment 121, the second side arm segment 133, and the first side arm segment 141 may extend in the first direction, while the second side arm segment 143, the first side arm segment 111, the second side arm segment 123, and the first side arm segment 131 may extend in the second direction perpendicular to the first direction, and the side arm segments of these two different extension directions may be used to form radiation signals with polarization directions perpendicular to each other, respectively.

In some embodiments, each radiator may further include an external arm segment connected between the first side arm segment and the second side arm segment. The specific quantity and shape of the external arm segments may be set according to actual needs, which are not limited here. For example, in some specific embodiments shown in FIGS. 4 and 12, the external arm segment may be a straight-line arm segment connected between the first side arm segment and the second side arm segment.

In some specific embodiments shown in FIG. 4 and FIG. 12, four external arm segments 112, 122, 132, and 142 of four radiators 110, 120, 130, and 140 may be arranged on four sides of a quadrilateral, respectively. In addition, as shown in FIG. 4 and FIG. 12, the four radiators 110, 120, 130 and 140 may be coplanarly arranged and located on a plane parallel to the reflector of the radiating element. In this way, the radiating element is in a box-like arrangement when viewed from a direction perpendicular to the plane on which the radiator is located.

FIG. 4 and FIG. 12 show the arrangement of a plurality of radiators in some specific embodiments. However, it may be understood that in some other specific embodiments, the radiating element may also include a plurality of radiators of other quantities and shapes, and the arrangement of these radiators may also be changed accordingly, which is not limited here. It may be understood by those skilled in the art that for other forms of radiating elements, the adverse effects of common mode currents on the HPBW and radiation directionality can still be attenuated by disposing a common mode current suppressing component as described later in an adjacent side arm segment.

In an exemplary embodiment of the present disclosure, the radiating element may further include a plurality of feeder rods, and each feeder rod may be electrically connected to a respective one of a plurality of first side arm segments and a plurality of second side arm segments, respectively, thereby feeding the corresponding side arm segment. In some embodiments, the extension direction of each feeder rod may be perpendicular to the plane on which the plurality of radiators are located. In some specific embodiments shown in FIG. 4 and FIG. 12, corresponding to the setting of the radiator, the radiating element 100 may include eight feeder rods 151-158, where the feeder rods 151, 153, 155 and 157 may be electrically connected to the second side arm segments 113, 123, 133 and 143, respectively, and the feeder rods 152, 154, 156 and 158 may be electrically connected to the first side arm segments 121, 131, 141 and 111, respectively. In this way, each side arm segment will be fed by a corresponding feeder rod, forming a total of eight groups of feeder rods and their connected side arm segments.

In addition, it may be understood that as the quantity, shape and arrangement of radiators in the radiating element changes, the quantity and arrangement of feeder rods may also change accordingly, which is not limited here.

Further, in the exemplary embodiment of the present disclosure, the radiating element may further include at least one common mode current suppressing component, which is connected between adjacent two groups of feeder rods and their connected side arm segments to achieve suppression of common mode currents. In some embodiments, each group of feeder rods and their connected side arm segments may include a first portion and a second portion that are electrically insulating from each other, where the first portion is located inside the radiating element as compared to the second portion; each common mode current suppressing component may include a first conductive portion and a second conductive portion that are adjacent to each other, where the first conductive portion may be electrically connected between a first portion of a group of feeder rods and their connected side arm segments and a second portion of an adjacent group of feeder rods and their connected side arm segments, and the second conductive portion may be electrically connected between a second portion of the group of feeder rods and their connected side arm segments and a first portion of the adjacent group of feeder rods and their connected side arm segments. By using the connection method described above, the current that originally flows directly from the first portion of the group of feeder rods and their connected side arm segments to the second portion (or from the second portion of the group of feeder rods and their connected side arm segments to the first portion) can be changed to flow through the following path, which includes the first portion of the group of feeder rods and their connected side arm segments, the first conductive portion of the common mode current suppressing component, and the second portion of the adjacent group of feeder rods and their connected side arm segments (or the path includes the second portion of the group of feeder rods and their connected side arm segments, the second conductive portion of the common mode current suppressing component, and the first portion of the adjacent group of feeder rods and their connected side arm segments). In this way, flow directions of a common mode current from adjacent two groups of feeder rods and their connected side arm segments will be opposite in the first conductive portion and the second conductive portion of the common mode current suppressing component, and because the first conductive portion and the second conductive portion are adjacent to each other, there is a certain coupling effect therebetween, so that the common mode current can be greatly reduced or even completely eliminated here, thereby reducing or even eliminating the common mode current flowing in each group of feeder rods and their connected side arm segments accordingly, thereby inhibiting the adverse effect of the common mode current on the radiation signal. In addition, flow directions of a differential mode current from adjacent two groups of feeder rods and their connected side arm segments are the same in the first conductive portion and the second conductive portion of the common mode current suppressing component, and they will not weaken or cancel each other, so that the radiating element can still normally generate a radiation signal.

The quantity and position of the common mode current suppressing component in the radiating element may be changed as desired. For example, a corresponding common mode current suppressing component may be provided between any two adjacent groups of feeder rods and their connected side arm segments. For example, in the specific embodiments shown in FIG. 4 and FIG. 12, the radiating element may include common mode current suppressing components 161, 162, 163, and 164. However, as needed, a portion of the common mode current suppressing components therein may also be omitted, or more common mode current suppressing components may be provided in the radiating element, which is not limited herein.

In some embodiments, the common mode current suppressing component may be disposed between two adjacent side arm segments. Specifically, each side arm segment of at least two adjacent side arm segments may include a first radiation portion and a second radiation portion electrically isolated from each other, and the first radiation portion is located inside the radiating element compared to the second radiation portion; the first conductive portion of the common mode current suppressing component may be electrically connected between a first radiation portion of a first side arm segment of one radiator and a second radiation portion of a second side arm segment of an adjacent radiator, and the second conductive portion may be electrically connected between a second radiation portion of the first side arm segment of the one radiator and a first radiation portion of the second side arm segment of the adjacent radiator.

For example, in the specific embodiments shown in FIG. 4 to FIG. 8, the first side arm segment 121 may include a first radiating portion 1211 and a second radiating portion 1212 that are electrically insulated from each other, the second side arm segment 113 adjacent to the first side arm segment 121 may include a first radiating portion 1131 and a second radiating portion 1132 that are electrically insulated from each other, the first conductive portion 1611 of the common mode current suppressing component 161 may be electrically connected between the first radiating portion 1211 of the first side arm segment 121 and the second radiating portion 1132 of the second side arm segment 113, and the second conductive portion 1612 of the common mode current suppressing component 161 may be electrically connected between the second radiating portion 1212 of the first side arm segment 121 and the first radiating portion 1131 of the second side arm segment 113.

Further, in some embodiments, electrical insulation between the first conductive portion 1611 and the second conductive portion 1612 of the common mode current suppressing component 161 may be achieved by vacuum or air, etc. Alternatively, in some other embodiments, the common mode current suppressing component may further include an insulating portion disposed between the first conductive portion and the second conductive portion, so that the first conductive portion and the second conductive portion are electrically insulated from each other.

Figure 5:
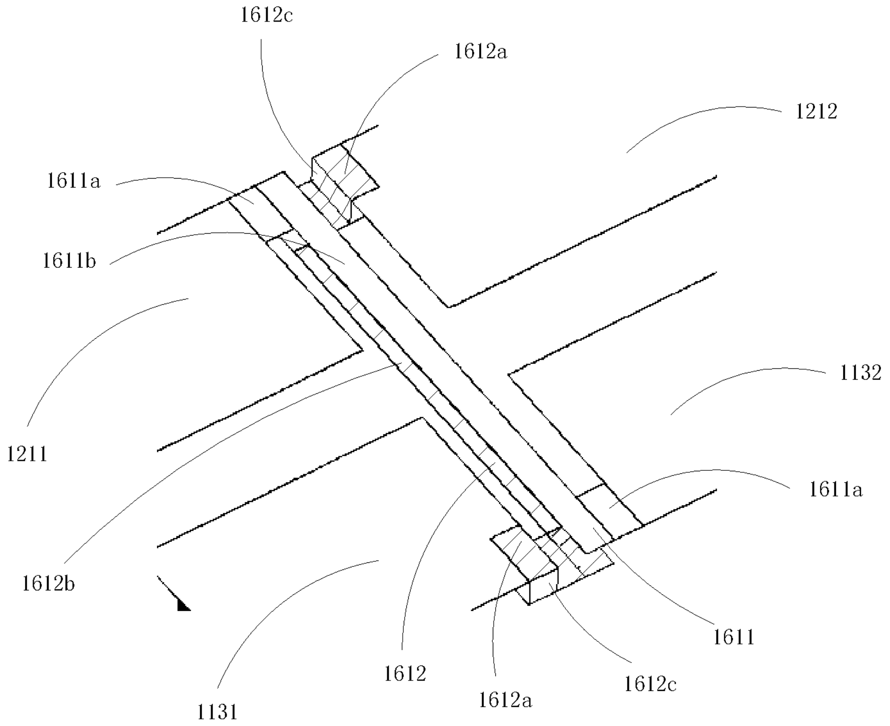
FIG. 5 shows an enlarged schematic view of a Z1 portion of FIG. 4.

In the specific embodiments shown in FIG. 4 and FIG. 5, the first conductive portion 1611 of the common mode current suppressing component 161 may include a first contact segment 1611*a* and a first transmission segment 1611*b* located on a first plane, where the first contact segment 1611*a* is electrically connected between the corresponding side arm segment and the first transmission segment 1611*b*. In addition, the second conductive portion 1612 of the common mode current suppressing component 161 (as shown in the shaded area in the figure) may include a second contact segment 1612*a* located on the first plane, a second transmission segment 1612*b* located on a second plane parallel to the first plane, and a conductive through hole 1612*c* electrically connected between the second contact segment 1612*a* and the second transmission segment 1612*b*, where the second contact segment 1612*a* is electrically connected between the corresponding side arm segment and the second transmission segment 1612*b*, and the conductive through hole 1612*c* is provided in an insulating portion located between the first plane and the second plane. Such an arrangement may allow common mode currents in the side arm segments 113 and 121 to be transmitted along desired paths without interference, respectively. Typically, lengths of the first and second transmission segments 1611*b*, 1612*b* are longer relative to the first and second contact segments 1611*a*, 1612*a*, i.e., the common mode currents are canceled primarily while flowing in the first and second transmission segments 1611*b*, 1612*b*. In order to achieve better suppression of the common mode current, the first and second transmission segments may be parallel to each other, and the distance between them may be in microns or millimeters. For example, the distance between the first transmission segment and the second transmission segment may be less than or equal to 5 mm, or less than or equal to 1 mm. Alternatively, the distance between the first plane in which the first transmission segment is located and the second plane in which the second transmission segment is located may be in microns or millimeters, for example may be less than or equal to 5 mm, or less than or equal to 1 mm. It should be noted that if the distance between the first conductive portion and the second conductive portion (or the first transmission segment and the second transmission segment, or the first plane and the second plane) is too large, the suppression effect on the common mode current will be significantly reduced.

It may be understood that in some other embodiments, the main transmission segments of the first conductive portion and the second conductive portion may also be located on the same plane as long as they can be electrically insulated from each other, and the distance between the first conductive portion and the second conductive portion (or the main transmission segments of the first conductive portion and the second conductive portion) needs to be short enough to achieve effective suppression on the common mode current.

Figure 6:
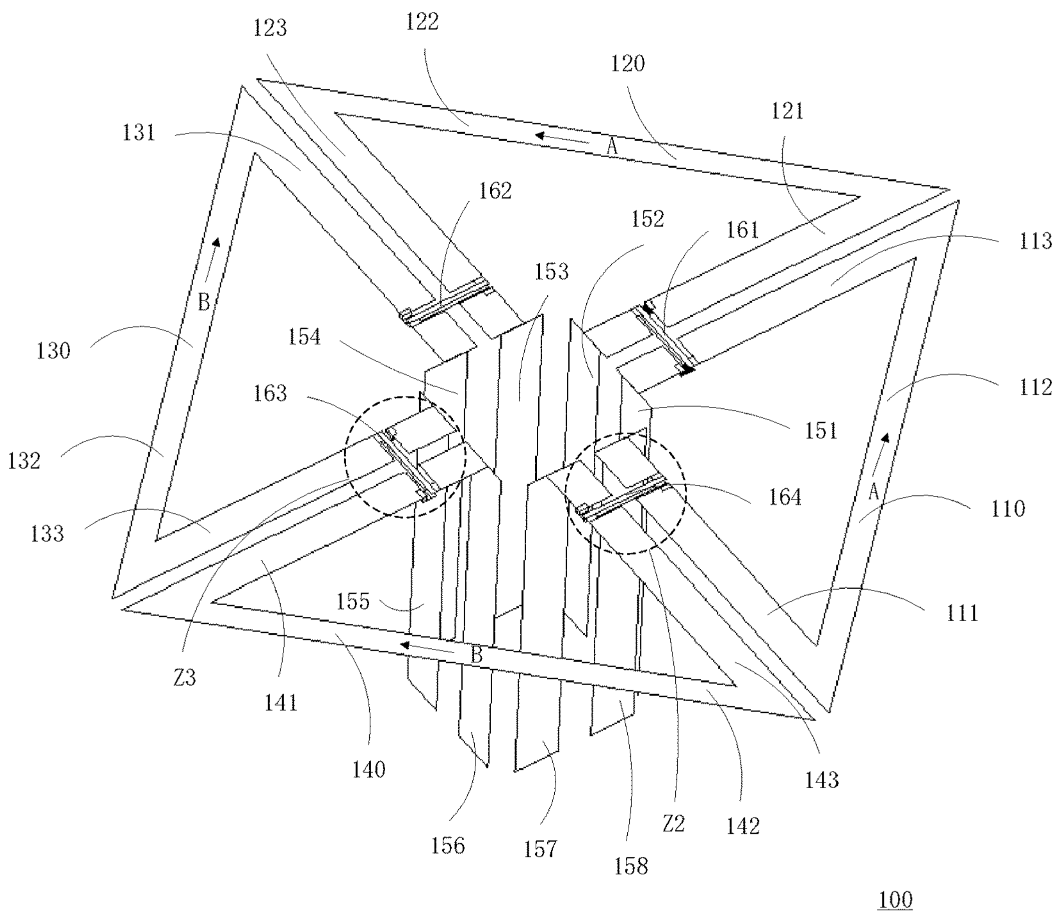
FIG. 6 shows a feeding schematic diagram of the radiating element of FIG. 4.
Figure 7:
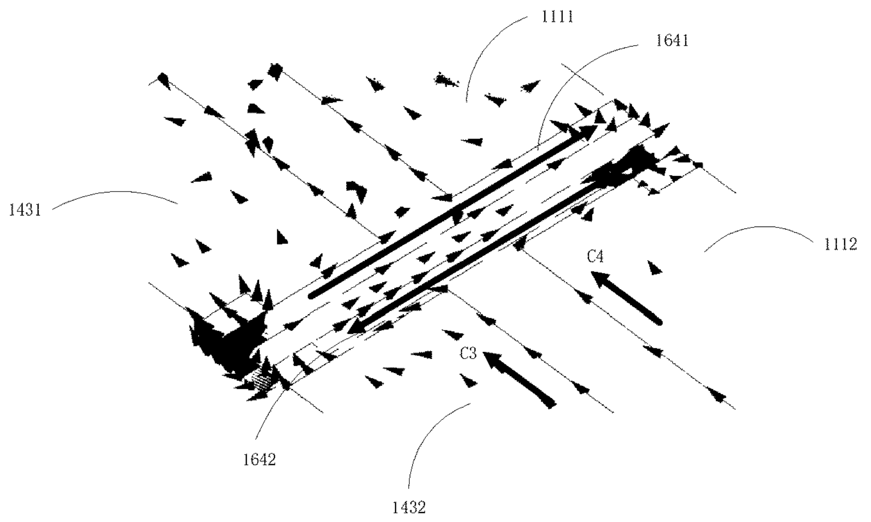
FIG. 7 shows an enlarged schematic view of a Z2 portion of FIG. 6.

FIG. 6 shows a feed schematic diagram of the radiating element of FIG. 4, and FIG. 7 is an enlarged schematic diagram of a Z2 portion of FIG. 6, showing the flow of the common mode current in the common mode current suppressing component. As shown in FIG. 6 and FIG. 7, directions of the common mode currents C3 and C4 flowing in the second side arm segment 143 and the first side arm segment 111, respectively, are consistent. When they pass through the first transmission segment of the first conductive portion 1641 and the second transmission segment of the second conductive portion 1642 of the common mode current suppressing component 164, respectively, the flow directions are substantially opposite (as shown by the arrows in the figure). In addition, since the first conductive portion 1641 and the second conductive portion 1642 are arranged adjacent, under the action of mainly inductive coupling effect, the common mode currents will be offset against each other, so that the common mode currents in the second radiating portion 1432 of the second side arm segment 143 and the second radiating portion 1112 of the first side arm segment 111 will be reduced or substantially zero, so that a signal radiated on a second radiation portion of the side arm segment will be greatly weakened by the common mode currents, so that the HPBW of the eventually generated radiation signal narrows and directionality thereof improves.

Figure 8:
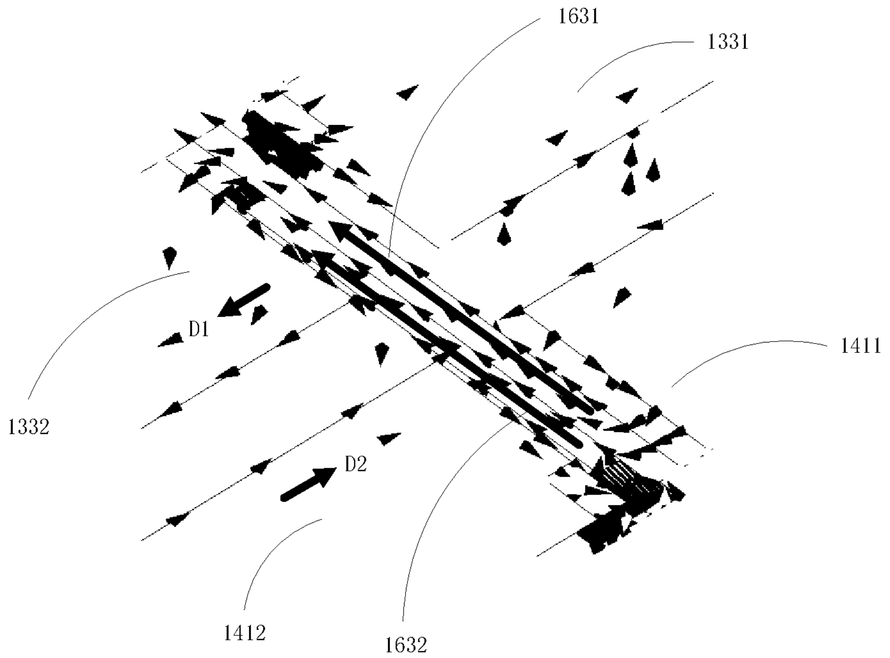
FIG. 8 shows an enlarged schematic view of a Z3 portion of FIG. 6.

FIG. 8 is an enlarged schematic view of a Z3 portion of FIG. 6 illustrating the flow of differential mode current in a common mode current suppressing component. As shown in FIG. 6 and FIG. 8, directions of differential mode currents flowing in the second side arm segment 133 and the first side arm segment 141 respectively are opposite, so when passing through the first conductive portion 1631 and the second conductive portion 1632 of the common mode current suppressing component 163, respectively, the directions of the differential mode currents are substantially the same (as shown by the arrows in the figure), so that the differential mode currents can still be retained and continue to flow onto the second radiation portion 1332 of the second side arm segment 133 and the second radiation portion 1412 of the first side arm segment 141 for generating a radiation signal.

In an exemplary embodiment of the present disclosure, the common mode current suppressing component may be disposed anywhere on the side arm segment. However, in some embodiments, in order to further improve the radiation performance of the radiating element, the common mode current suppressing component may be disposed close to the interior of the radiating element to leave a sufficient length of the second radiation portion of the side arm segment for radiation. Further, in some embodiments, the length of the second radiation portion of the side arm segment may be less than or equal to ¼ times the center operating wavelength. Ideally, the length of the second radiation portion of the side arm segment may be substantially equal to ¼ times the center operating wavelength to obtain a better radiation effect. However, considering some possible interference factors, through actual debugging, the length of the second radiation part may be set to slightly less than ¼ times the operating wavelength of the center to achieve a good radiation effect.

Figure 9:
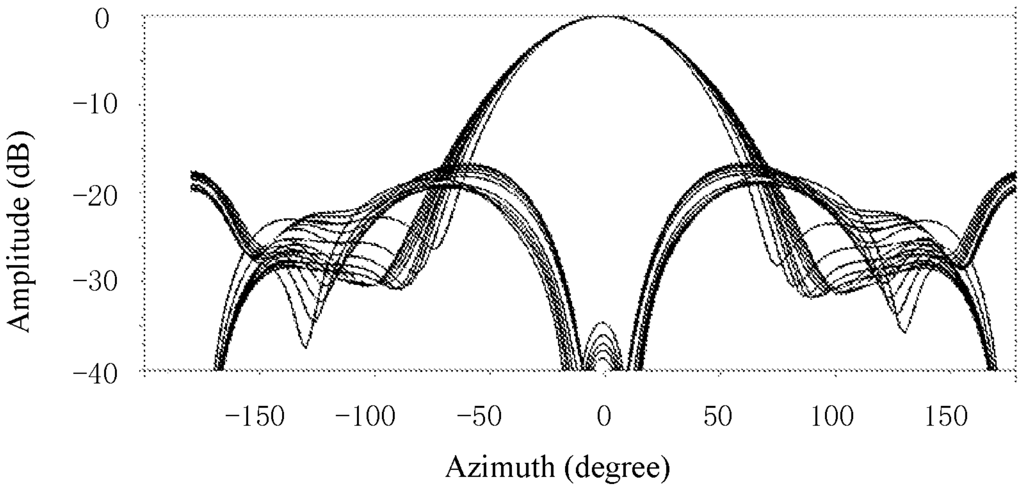
FIG. 9 shows a schematic diagram of a radiation pattern of the radiating element of FIG. 4 in an azimuth plane.
Figure 10:
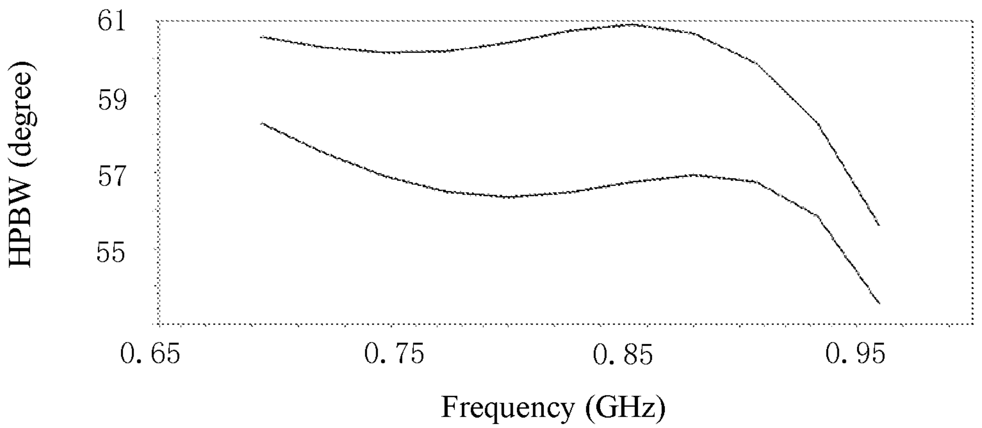
FIG. 10 shows a schematic diagram of an HPBW of a radiation signal generated by the radiating element of FIG. 1 and FIG. 4.
Figure 11:
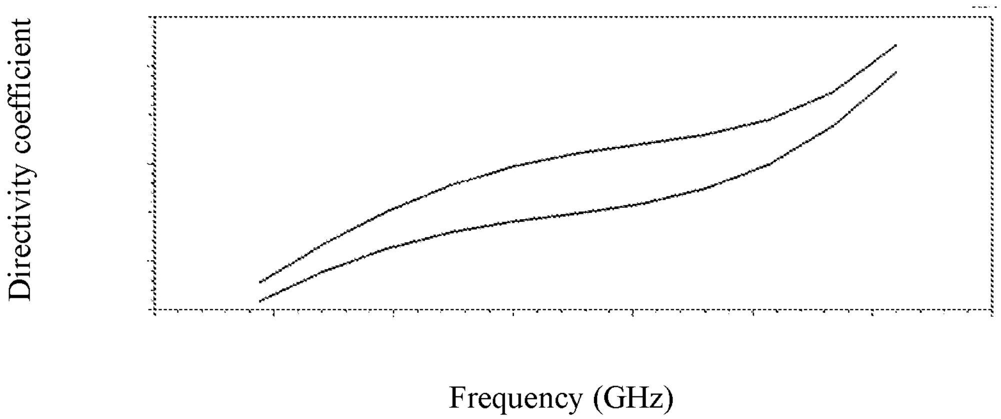
FIG. 11 shows a schematic diagram of a directionality coefficient of a radiation signal generated by the radiating element of FIG. 1 and FIG. 4.

FIG. 9 shows a schematic diagram of a radiation pattern of the radiating element of FIG. 4. Compared with the radiation pattern generated by the radiating element of FIG. 1 shown in FIG. 3, the HPBW and directionality of the radiation signal are improved. Specifically, as shown in FIG. 10, the upper curve represents the HPBW of radiation signals generated by the radiating element of FIG. 1 at different frequencies, and the lower curve represents the HPBW of radiation signals generated by the radiating element of FIG. 4. Compared with the HPBW of the radiation signals generated by the radiating element of FIG. 1, the HPBW of the radiation signals generated by the radiating element of FIG. 4 is reduced by 3-5°. As shown in FIG. 11, the upper curve represents directivity coefficients of radiation signals generated by the radiating element of FIG. 1 at different frequencies, and the lower curve represents directivity coefficients of radiation signals generated by the radiating element of FIG. 4. Compared with the directivity coefficients of the radiation signals generated by the radiating element of FIG. 1, the directivity coefficients of the radiation signals generated by the radiating element of FIG. 4 have improved by about 0.2 dBi.

In another exemplary embodiment of the present disclosure, the common mode current suppressing component may be disposed between two adjacent feeder rods. Specifically, each feeder rod of at least two adjacent feeder rods may include a first feed portion and a second feed portion electrically isolated from each other, and the second feed portion is directly connected to a corresponding side arm segment; the first conductive portion of the common mode current suppressing component may be electrically connected between a first feed portion of a feeder rod and a second feed portion of an adjacent feeder rod, and the second conductive portion may be electrically connected between a second feed portion of the one feeder rod and a first feed portion of the adjacent feeder rod.

Figure 13:
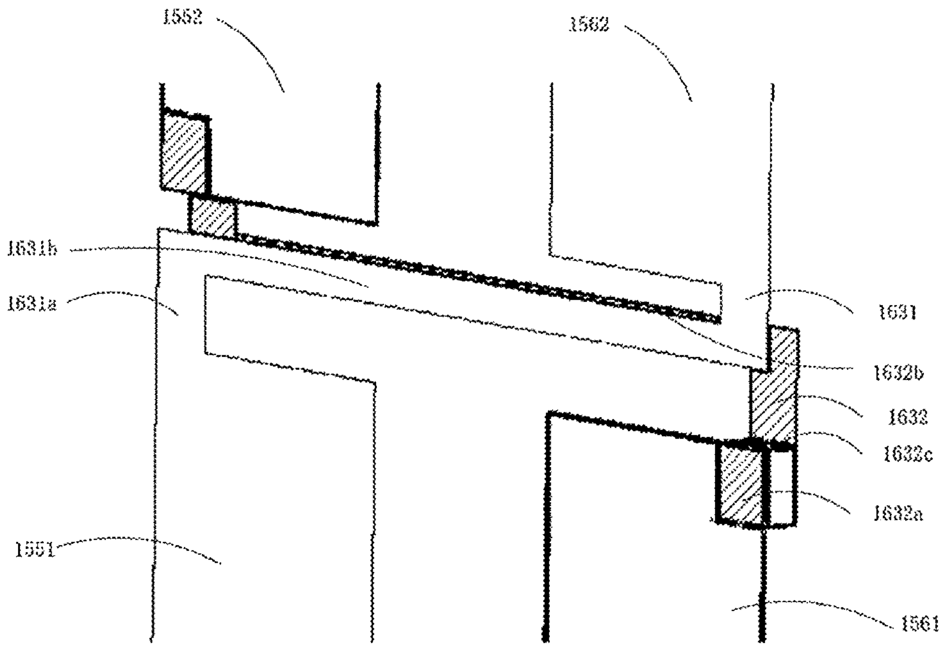
FIG. 13 shows an enlarged schematic view of a Z4 portion of FIG. 12.

Specifically, as shown in FIG. 12 and FIG. 13, the feeder rod 155 may include a first feed portion 1551 and a second feed portion 1552 electrically insulated from each other, the feeder rod 156 adjacent to the feeder rod 155 may include a first feed portion 1561 and a second feed portion 1562 electrically insulated from each other, the first conductive portion 1631 of the common mode current suppressing component 163 may be electrically connected between the first feed portion 1551 of the feeder rod 155 and the second feed portion 1562 of the feeder rod 156, and the second conductive portion 1632 of the common mode current suppressing component 163 (as shown in the shaded area) may be electrically connected between the second feed portion 1552 of the feeder rod 155 and the first feed portion 1561 of the feeder rod 156. After the common mode currents flowing in the feeder rods 155 and 156 flow into the first and second conductive portions 1631, 1632 of the common mode current suppressing component 163, their flow directions are substantially opposite, so that they may be reduced or even eliminated, so that a small portion of the common mode current or even no common mode current even continues to be fed to the radiator of the radiating element, thereby reducing the adverse effect of the common mode current on the radiation signal. In addition, the differential mode currents flowing in the feeder rods 155 and 156 have substantially the same flow direction in the first and second conductive portions 1631, 1632 of the common mode current suppressing component 163, so they are still possible to be fed onto the radiator of the radiating element to generate a radiation signal.

In the specific embodiment shown in FIG. 13, the first conductive portion 1631 of the common mode current suppressing component 163 may include a first contact segment 1631*a* and a first transmission segment 1631*b* located on a first plane, where the first contact segment 1631*a* may be electrically connected between a corresponding feeder rod and the first transmission segment 1631*b*. In addition, the second conductive portion 1632 of the common mode current suppressing component 163 may include a second contact segment 1632*a* located on the first plane, a second transmission segment 1632*b* located on the second plane parallel to the first plane, and a conductive through hole 1632*c* electrically connected between the second contact segment 1632*a* and the second transmission segment 1632*b*, where the second contact segment 1632*a* is electrically connected between a corresponding feeder rod and the second transmission segment 1632*b*, and the conductive through hole 1632*c* may be provided in an insulating portion located between the first plane and the second plane. Such an arrangement may be such that the common mode currents in the feeder rods 155 and 156 are transmitted along desired paths without interference, respectively. Typically, the lengths of the first and second transmission segments 1631*b*, 1632*b* are longer relative to the first and second contact segments 1631*a*, 1632*a*, i.e., the common mode currents are canceled primarily while flowing in the first and second transmission segments 1631*b*, 1632*b*. In order to achieve better suppression of the common mode current, the first and second transmission segments may be parallel to each other and the distance between them may be in microns or millimeters, for example the distance between the first and second transmission segments may be less than or equal to 5 mm, or less than or equal to 1 mm. Alternatively, the distance between the first plane in which the first transmission segment is located and the second plane in which the second transmission segment is located may be in microns or millimeters, for example may be less than or equal to 5 mm, or less than or equal to 1 mm. It should be noted that if the distance between the first conductive portion and the second conductive portion (or the first transmission segment and the second transmission segment, or the first plane and the second plane) is too large, the suppression effect on the common mode current will be significantly reduced.

It may be understood that in some other embodiments, the first and second conductive portions may also be arranged in other ways in particular, so long as the flow directions of the common mode currents in them are substantially the same, so as to be offset in the first and second conductive portions adjacent to each other, and the differential mode currents are not greatly weakened by the common mode current suppressing component, which is not limited here.

Further, in the embodiments shown in FIG. 12 and FIG. 13, the length of the side arm segment of the radiating element may be less than or equal to ¼ times the center operating wavelength. In an ideal situation, the length of the side arm segment may be substantially equal to ¼ times the center operating wavelength to obtain a better radiation effect. However, considering some possible interference factors, through actual debugging, the length of the side arm segment may be set to slightly less than ¼ times the center operating wavelength to achieve a better radiation effect.

In the embodiments shown in FIG. 4 and FIG. 12, the common mode current suppressing component may be connected to each group of feeder rods and their connected side arm segments, and this common mode current suppressing component may be connected between two adjacent side arm segments, or connected between two adjacent feeder rods, or one end of the first conductive portion or the second conductive portion of the common mode current suppressing component may be directly connected to the feeder rod, and the other end may be directly connected to the side arm segment connected to the adjacent feeder rod.

In yet another exemplary embodiment of the present disclosure, each group of feeder rods and their connected side arm segments may be connected to a plurality of common mode current suppressing components to achieve a better common mode current suppressing effect. For example, in some embodiments, at least one group of feeder rods and their connected side arm segments may be connected to two common mode current suppressing components, one common mode current suppressing component may be electrically connected between two adjacent feeder rods, and the other common mode current suppressing component may be electrically connected between two adjacent side arm segments, thereby improving the HPBW and directionality of the radiation signal. It may be understood that in some other embodiments, a plurality of common mode current suppressing components may also be provided only between adjacent two feeder rods; or a plurality of common mode current suppressing components may be provided only between adjacent two side arm segments; or some common mode current suppressing components may be provided between adjacent two feeder rods, and other common mode current suppressing components may be provided between adjacent two side arm segments; or for a common mode current suppressing component, one end of a first conductive portion or a second conductive portion thereof may be directly connected to the feeder rod, while the other end thereof is directly connected to the side arm segment connected to the adjacent feeder rod.

In addition, the present disclosure has also proposed a base station antenna; and the base station antenna may include the radiating element described above.

In some embodiments, the base station antenna may include a multi-band base station antenna, which may include at least one linear array of relatively "low-band" radiating elements, which may be used to provide services in part or all of a 617-960 MHz frequency band. Furthermore, to reduce costs and provide a more compact antenna, each of these "low-band" radiating elements may be configured to surround a corresponding relatively "high-band" radiating element that may be used to provide services in part or all of a 1695-2690 MHz frequency band. In some embodiments, the structure of the "low-band" radiating element may be the structure of the radiating element described above.

In all examples shown and discussed herein, any specific value should be construed as merely exemplary value and not as limiting value. Therefore, other examples of the exemplary embodiments may have different values.

The words "front", "rear", "top", "bottom", "above", "below", etc. in the Specification and Claims, if present, are used for descriptive purposes and are not necessarily used to describe constant relative positions. It should be understood that the terms used in this way are interchangeable under appropriate circumstances, so that the embodiments of the present disclosure described herein, for example, can operate on other orientations that differ from those orientations shown herein or otherwise described.

As used herein, the word "exemplary" means "serving as an example, instance, or illustration" rather than as a "model" to be copied exactly. Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means comprising any minor changes caused by design or manufacturing defects, device or component tolerances, environmental influences, and/or other factors. The word "basically" also allows the gap from the perfect or ideal situation due to parasitic effects, noise, and other practical considerations that may be present in the actual realization.

The above description may indicate elements or nodes or features that are "connected" or "coupled" together. As used herein, unless specified otherwise, "connect" means that an element/node/feature is directly electrically, mechanically, logically connected, or connected in other manners (or directly communicated) with another element/node/feature. Similarly, unless explicitly stated otherwise, "coupled" means that one element/node/feature can be mechanically, electrically, logically or otherwise connected to another element/node/feature in a direct or indirect manner to allow interaction, even though the two features may not be directly connected. That is, "coupled" is intended to comprise direct and indirect connection of components or other features, including connection using one or a plurality of intermediate components.

It should also be understood that when the term "include/comprise" is used in this text, it indicates the presence of the specified feature, entirety, step, operation, unit and/or component, but does not exclude the presence or addition of one or more other features, entireties, steps, operations, units and/or components and/or combinations thereof.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include a plurality of instances of specific operations, and the order of operations may be changed in various other embodiments. However, other modifications, changes and substitutions are also possible. Therefore, the Specification and attached drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

The invention claimed is:

1. A radiating element, wherein the radiating element comprises:

a plurality of radiators, wherein each radiator of the plurality of radiators comprises a first side arm segment and a second side arm segment, and a first side arm segment of one radiator and a second side arm segment of an adjacent radiator are adjacent to each other;

a plurality of feeder rods, wherein each feeder rod of the plurality of feeder rods is electrically connected to a respective one of a plurality of first side arm segments and a plurality of second side arm segments, wherein each group of feeder rods and their connected side arm segments comprise a first portion and a second portion electrically insulated from each other, and the first portion is located inside the radiating element compared to the second portion; and at least one common mode current suppressing component, wherein each common mode current suppressing component of the at least one common mode current suppressing component comprises a first conductive portion and a second conductive portion adjacent to each other and electrically insulating, wherein the first conductive portion is electrically connected between a first portion of a group of feeder rods and their connected side arm segments and a second portion of an adjacent group of feeder rods and their connected side arm segments, and the second conductive portion is electrically connected between a second portion of the group of feeder rods and their connected side arm segments and a first portion of the adjacent group of feeder rods and their connected side arm segments, so that common mode currents from adjacent two groups of feeder rods and their connected side arm segments flow in opposite directions in the first conductive portion and the second conductive portion of the common mode current suppressing component.

2. The radiating element according to claim 1, wherein differential mode currents from adjacent two groups of feeder rods and their connected side arm segments flow in a same direction in the first conductive portion and the second conductive portion of the common mode current suppressing component.

3. The radiating element according to claim 1, wherein each side arm segment of at least two adjacent side arm segments comprises a first radiation portion and a second radiation portion electrically isolated from each other, and the first radiation portion is located inside the radiating element compared to the second radiation portion; the first conductive portion of the common mode current suppressing component is electrically connected between a first radiation portion of a first side arm segment of one radiator and a second radiation portion of a second side arm segment of an adjacent radiator, and the second conductive portion is electrically connected between a second radiation portion of the first side arm segment of the one radiator and a first radiation portion of the second side arm segment of the adjacent radiator.

4. The radiating element according to claim 3, wherein a length of the second radiation portion of the side arm segment is less than or equal to ¼ times the center operating wavelength.

5. The radiating element according to claim 1, wherein each feeder rod of at least two adjacent feeder rods comprises a first feed portion and a second feed portion electrically isolated from each other, and the second feed portion is directly connected to a corresponding side arm segment; the first conductive portion of the common mode current suppressing component is electrically connected between a first feed portion of a feeder rod and a second feed portion of an adjacent feeder rod, and the second conductive portion is electrically connected between a second feed portion of the one feeder rod and a first feed portion of the adjacent feeder rod.

6. The radiating element according to claim 5, wherein a length of the side arm segment is less than or equal to ¼ times the center operating wavelength.

7. The radiating element according to claim 1, wherein one or more common mode current suppressing components are connected to each group of feeder rods and their connected side arm segments.

8. The radiating element according to claim 7, wherein at least one group of feeder rods and their connected side arm segments are connected to two common mode current suppressing components, wherein one common mode current suppressing component is electrically connected between two adjacent feeder rods, and the other common mode current suppressing component is electrically connected between two adjacent side arm segments.

9. The radiating element according to claim 1, wherein the first side arm segment of the one radiator and the second side arm segment of the adjacent radiator are parallel to each other.

10. The radiating element according to claim 1, wherein a portion of the plurality of first side arm segments and a portion of the plurality of second side arm segments extend in a first direction, and another portion of the side arm segments extend in a second direction perpendicular to the first direction.

11. The radiating element according to claim 1, wherein an extension direction of each feeder rod of the plurality of feeders is perpendicular to a plane in which the plurality of radiators are located.

12. The radiating element according to claim 1, wherein each radiator further comprises an external arm segment connected between the first side arm segment and the second side arm segment.

13. The radiating element according to claim 12, wherein the radiating element comprises four radiators arranged coplanarly, and four external arm segments of the four radiators are respectively arranged on four sides of a quadrilateral.

14. The radiating element according to claim 1, wherein the common mode current suppressing component further comprises an insulating portion disposed between the first conductive portion and the second conductive portion.

15. The radiating element according to claim 14, wherein the first conductive portion of the common mode current suppressing component comprises a first contact segment and a first transmission segment located on a first plane, wherein the first contact segment is electrically connected between the feeder rod and its connected side arm segment and the first transmission segment; and the second conductive portion of the common mode current suppressing component comprises a second contact segment located on the first plane, a second transmission segment located on a second plane parallel to the first plane, and a conductive through hole electrically connected between the second contact segment and the second transmission segment, wherein the second contact segment is electrically connected between the feeder rod and its connected side arm segment and the second transmission segment, and the conductive through hole is provided in an insulating portion located between the first plane and the second plane.

16. The radiating element according to claim 15, wherein the first transmission segment and the second transmission segment are parallel to each other.

17. A radiating element, comprising:

a plurality of radiators, wherein each radiator of the plurality of radiators comprises a first side arm segment and a second side arm segment, and a first side arm segment of one radiator and a second side arm segment of an adjacent radiator are adjacent to each other, wherein a common mode current suppression circuit electrically connects a first side arm segment of a first of the radiators to a second side arm segment of a second of the radiators, wherein the common mode current suppression circuit includes a first conductive portion that is electrically connected between a first radiation portion of the first side arm segment of the first of the radiators and a second radiation portion of the second side arm segment of the second of the radiators, and a second conductive portion that is electrically connected between a second radiation portion of the first side arm segment of the first of the radiators and a first radiation portion of the second side arm segment of the second of the radiators.

18. The radiating element according to claim 17, wherein the first side arm segment of the first of the radiators is adjacent the second side arm segment of the second of the radiators.

19. The radiating element according to claim 17, wherein a respective common mode current suppression circuit electrically connects a first side arm segment of a each of the radiators to a second side arm segment of a different one of the radiators.

* * * * *